(12) United States Patent
Thornberg et al.

(10) Patent No.: US 11,275,373 B2
(45) Date of Patent: Mar. 15, 2022

(54) ADAPTIVE CONTROL OF AIRCRAFT USING STRUCTURAL HEALTH MONITORING

(71) Applicant: Sikorsky Aircraft Corporation, Stratford, CT (US)

(72) Inventors: Christopher A. Thornberg, Newtown, CT (US); Glen A. Knaust, Palm City, FL (US); Derek H. Geiger, Wilton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 230 days.

(21) Appl. No.: 16/610,965

(22) PCT Filed: May 26, 2017

(86) PCT No.: PCT/US2017/034626
§ 371 (c)(1),
(2) Date: Nov. 5, 2019

(87) PCT Pub. No.: WO2018/217210
PCT Pub. Date: Nov. 29, 2018

(65) Prior Publication Data
US 2020/0103897 A1    Apr. 2, 2020

(51) Int. Cl.
*G05D 1/00* (2006.01)
*B64C 13/50* (2006.01)
(Continued)

(52) U.S. Cl.
CPC ......... *G05D 1/0061* (2013.01); *B64C 13/503* (2013.01); *B64C 13/506* (2018.01);
(Continued)

(58) Field of Classification Search
None
See application file for complete search history.

(56) References Cited

U.S. PATENT DOCUMENTS 7,636,618 B2 * 12/2009 Cordova .................. G07C 5/08
340/945
9,969,485 B2 * 5/2018 Davies .................... B64C 13/22
(Continued)

FOREIGN PATENT DOCUMENTS

WO    2015001320 A1    1/2015

OTHER PUBLICATIONS

International Search Report and Written Opinion; International Application No. PCT/US17/34626; International Filing Date: May 26, 2017; dated Aug. 25, 2017; pp. 1-14.

*Primary Examiner* — Todd Melton
(74) *Attorney, Agent, or Firm* — Michael Best & Friedrich LLP

(57) ABSTRACT

A method for providing adaptive control to a fly-by-wire aircraft includes measuring via at least one first sensor a characteristic of at least one component of the aircraft and measuring via at least one second sensor a state of the aircraft. Using the characteristic of at least one component and the state of the aircraft, a determination of at least one of an actual damage and remaining life of the at least one component is made. The operational envelope of the aircraft is adapted based on the at least one of actual damage and remaining life of the at least one component. Adapting the operational envelope includes adjusting an outer boundary thereof to prohibit operation exceeding a safe operation threshold and generating an intermediate boundary of the operational envelope. Operation of the aircraft within the intermediate boundaries minimizes further damage accrual of the at least one component.

18 Claims, 3 Drawing Sheets

(51) Int. Cl.
  *B64F 5/60* (2017.01)
  *B64D 43/00* (2006.01)
  *B64D 45/00* (2006.01)
  *G05D 1/10* (2006.01)

(52) U.S. Cl.
  CPC ............ *B64D 43/00* (2013.01); *B64D 45/00* (2013.01); *B64F 5/60* (2017.01); *G05D 1/0066* (2013.01); *G05D 1/101* (2013.01); *B64D 2045/0085* (2013.01)

(56) References Cited

U.S. PATENT DOCUMENTS

| | | | |
|---|---|---|---|
| 10,093,435 B2 * | 10/2018 | Da Silva | B64D 45/00 |
| 2002/0000125 A1 | 1/2002 | Beardmore | |
| 2011/0245999 A1 | 10/2011 | Kordonowy | |
| 2014/0244075 A1 * | 8/2014 | Litwinowicz | G05D 1/0066 701/3 |
| 2014/0316613 A1 | 10/2014 | Jang et al. | |

* cited by examiner

ADAPTIVE CONTROL OF AIRCRAFT USING STRUCTURAL HEALTH MONITORING

CROSS REFERENCE TO RELATED APPLICATIONS

This application is a National Stage application of PCT/US2017/034626, filed May 26, 2017, which is incorporated by reference in its entirety herein.

BACKGROUND

Exemplary embodiments of the disclosure generally relate to a structural health monitoring of a rotary wing aircraft, and more particularly, to controlling operation of the aircraft in response to structural health monitoring.

Generally, load monitoring through either measurement by physical sensor(s) or virtual monitoring of loads, using load estimation and validation methods, are enabling technologies in structural design, flight control, and fleet management. However, load monitoring, especially virtual monitoring of loads, has yet to be leveraged in downstream processes to provide real value, while maintaining safety and reliability, to original equipment manufacturers, customers, and operators. The lack of effectively leveraged load monitoring by physical sensors is indicative of perceived difficulties, increased weight, and reliability issues associated with deploying the many physical sensors that would be required to monitor all such local loads, especially in rotor systems.

BRIEF DESCRIPTION

According to an embodiment, a method for providing adaptive control to a fly-by-wire aircraft includes measuring via at least one first sensor a characteristic of at least one component of the aircraft and measuring via at least one second sensor a state of the aircraft. Using the characteristic of at least one component and the state of the aircraft, a determination of at least one of an actual damage and remaining life of the at least one component is made. The operational envelope of the aircraft is adapted based on the at least one of actual damage and remaining life of the at least one component. Adapting the operational envelope includes adjusting an outer boundary thereof to prohibit operation exceeding a safe operation threshold and generating an intermediate boundary of the operational envelope. Operation of the aircraft within the intermediate boundaries minimizes further damage accrual of the at least one component.

In addition to one or more of the features described above, or as an alternative, in further embodiments measuring the characteristic of the at least one component and the measuring of the state of the aircraft occur while the aircraft is in flight.

In addition to one or more of the features described above, or as an alternative, in further embodiments adapting the operational envelope occurs automatically and in real time while the aircraft is in flight.

In addition to one or more of the features described above, or as an alternative, in further embodiments comprising providing one or more indicators of the adapted operational envelope to personnel associated with the aircraft.

In addition to one or more of the features described above, or as an alternative, in further embodiments the adapted operational envelope is illustrated graphically on a display.

In addition to one or more of the features described above, or as an alternative, in further embodiments providing one or more indicators of the adapted operational envelope includes providing feedback during operation of a pilot control via a tactile cuing system.

In addition to one or more of the features described above, or as an alternative, in further embodiments the feedback includes at least one of vibration and resistance.

In addition to one or more of the features described above, or as an alternative, in further embodiments the feedback is configured to indicate that a command generated via the pilot input is approaching loading of the aircraft that will accrue damage on the at least one component.

In addition to one or more of the features described above, or as an alternative, in further embodiments comprising revising at least one of a mission and a corresponding flight plan in response to the adapted operational envelope.

In addition to one or more of the features described above, or as an alternative, in further embodiments the aircraft is operable at a state between the one or more intermediate boundaries and the one or more outer boundaries.

According to another embodiment, a system for providing adaptive control of an aircraft includes at least one processor, at least one first sensor configured to monitor a characteristic of at least one component of the aircraft, and at least one second sensor configured to monitor a state of the aircraft. The at least one first sensor and at least one second sensor are arranged in communication with the at least one processor. A memory is arranged in communication with the at least one processor and has instructions stored thereon that, when executed by the at least one processor, cause the system to determine at least one of an actual damage and remaining life of the at least one component of the aircraft and adapt an operational envelope of the aircraft based on the at least one of actual damage and remaining life of the at least one component. Adaption of the operational envelope comprises adjusting one or more outer boundaries of the operational envelope to prohibit operation of the aircraft exceeding a safe or reliable operation threshold and generating one or more intermediate boundaries of the operational envelope. Operation of the aircraft within the intermediate boundaries minimizes further damage accrual of the at least one component.

In addition to one or more of the features described above, or as an alternative, in further embodiments the aircraft is a fly-by-wire aircraft.

In addition to one or more of the features described above, or as an alternative, in further embodiments the processor is configured to adapt the operational envelope of the aircraft in real time.

In addition to one or more of the features described above, or as an alternative, in further embodiments comprising an onboard mission and flight planner in communication with the processor, wherein the onboard mission and flight planner is operable to adapt a current mission and flight path in response to the adapted operational envelope.

In addition to one or more of the features described above, or as an alternative, in further embodiments comprising at least one output device operably coupled to the processor, the at least one output device providing an indication of the adapted operational envelope.

In addition to one or more of the features described above, or as an alternative, in further embodiments the at least one output device includes a display for graphically depicting the adapted operational envelope.

In addition to one or more of the features described above, or as an alternative, in further embodiments comprising at least one flight control for receiving a command and a tactile cuing system operably coupled to the at least one flight control and to the processor, wherein the tactile cuing system is operable to indicate when the command provided to the at least one flight control causes operation of the aircraft to approach the one or more intermediate boundaries.

In addition to one or more of the features described above, or as an alternative, in further embodiments the tactile cuing system is operable to indicate when the command provided to the at least one flight control causes operation of the aircraft to approach the one or more intermediate boundaries by providing a feedback to the at least one flight control including one or more of vibration and resistance.

BRIEF DESCRIPTION OF THE DRAWINGS

The subject matter is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Figure 1:
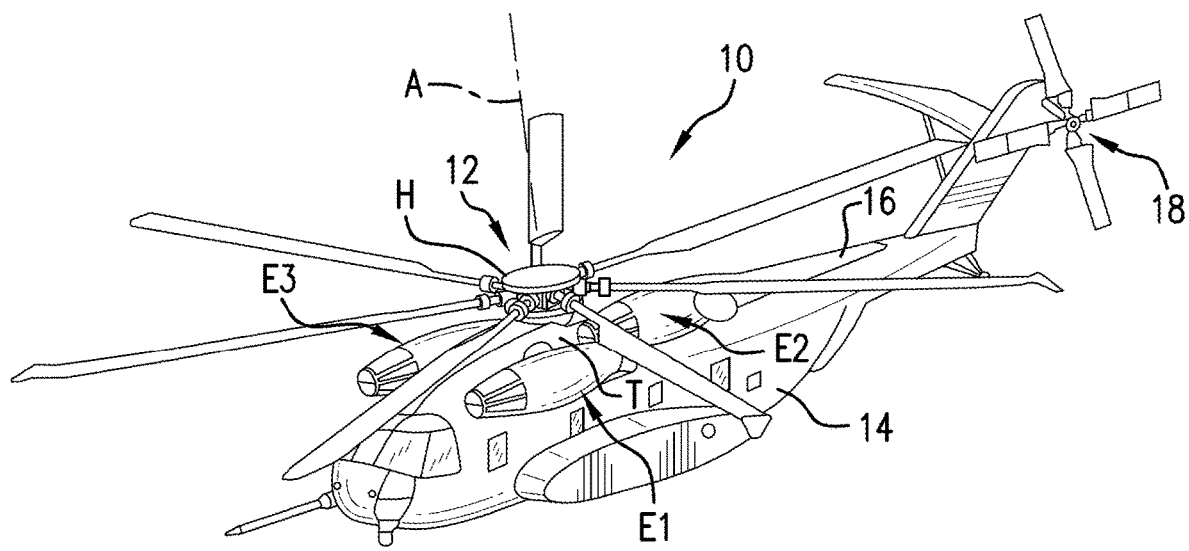
FIG. 1 is a general perspective side view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system, a translational thrust system, a pusher propeller, or a rotor propulsion system for example. Power is transferred from one or more engines E to a power transmission gearbox 20 (see FIGS. 2a and 2b), to drive the main rotor system 12 about a respective axis of rotation A. Although a particular rotary wing aircraft configuration is illustrated and described in the disclosed embodiment, other configurations and/or machines, such as a high speed compound rotary wing aircraft with supplemental translational thrust systems, a dual contra-rotating, coaxial rotor system aircraft, and a turbo-prop, tilt-rotor or tilt-wing aircraft for example, will also benefit from the present disclosure.

Figure 2:
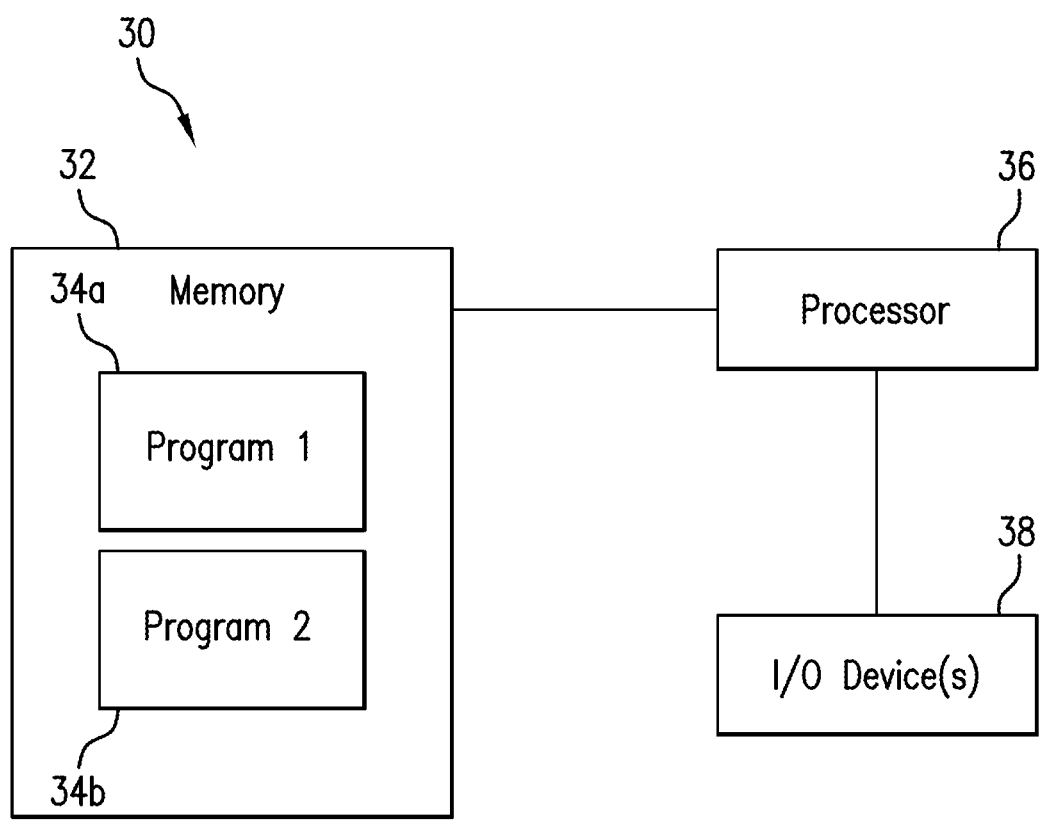
FIG. 2 is a schematic block diagram illustrating an example of a computing system of an aircraft.

With reference now to FIG. 2, an example of a computing system of the aircraft is shown. The system 30 is shown as including a memory 32. The memory 32 may store executable instructions. The executable instructions may be stored or organized in any manner and at any level of abstraction, such as in connection with one or more processes, routines, methods, etc. As an example, at least a portion of the instructions are shown in FIG. 2 as being associated with a first program 34a and a second program 34b.

The instructions stored in the memory 32 may be executed by one or more processors, such as a processor 36. The processor 36 may be coupled to one or more input/output (I/O) devices 38. In some embodiments, the I/O device(s) 38 may include one or more of a keyboard or keypad, a touchscreen or touch panel, a display screen, a microphone, a speaker, a mouse, a button, a remote control, a joystick, a printer, etc. The I/O device(s) 38 may be configured to provide an interface to allow a user to interact with the system 30.

The system 30 is intended as an example only. In some embodiments, one or more of the entities may be optional. In some embodiments, additional entities not shown may be included. For example, in some embodiments the system 30 may be associated with one or more networks or may be arranged or organized in a manner different from what is shown in FIG. 2.

Figure 3:
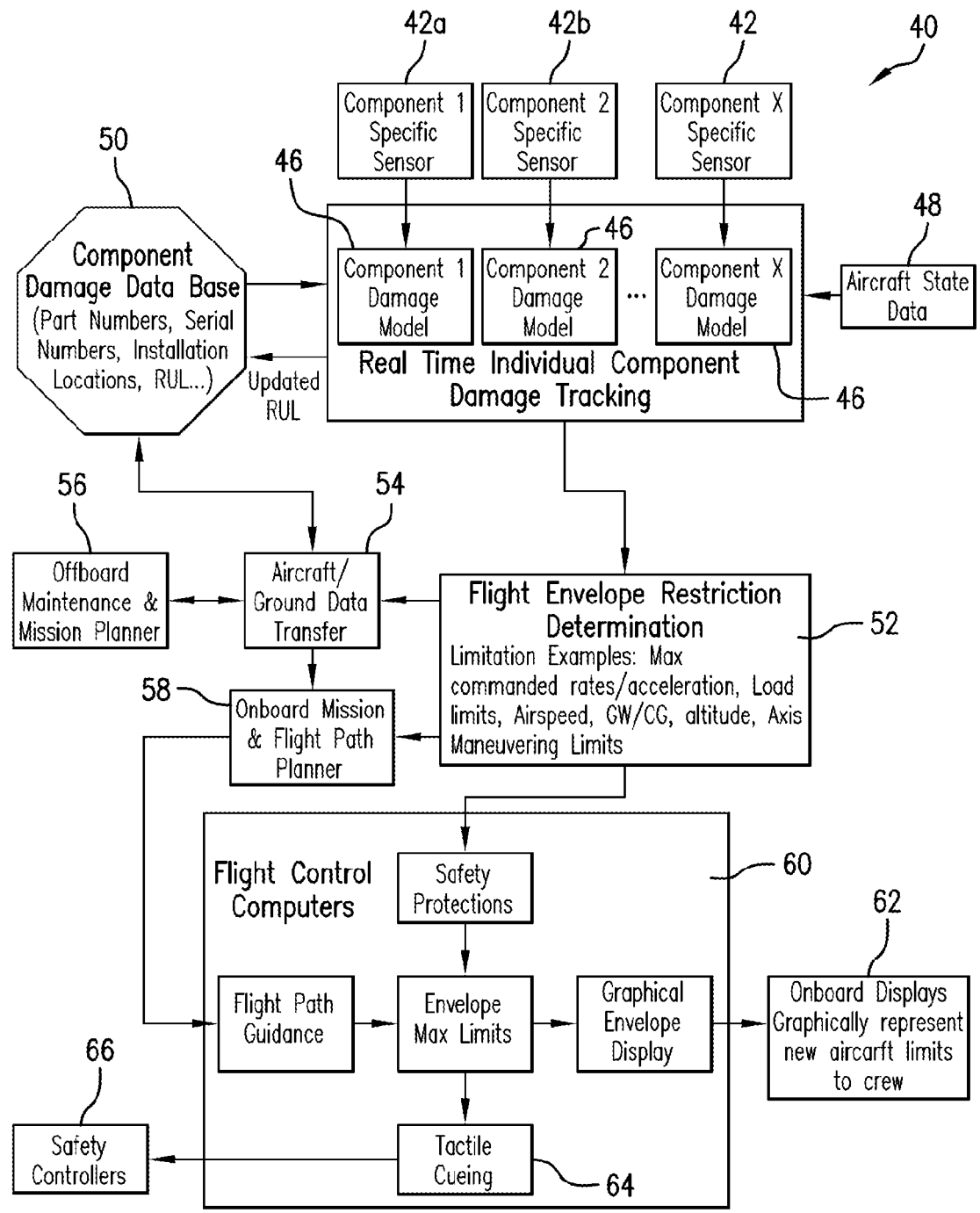
FIG. 3 is a block diagram of an adaptive control system for an aircraft according to an embodiment.

With reference now to FIG. 3, a block diagram of a system 40 for performing adaptive control of an aircraft, such as aircraft 10 for example, is illustrated. The block diagram may be implemented by one or more systems, devices or components such as those described herein. For example, the block diagram may be implemented in connection with the system of FIG. 2. Behavior and/or operation of one or more components or subsystems of the aircraft 10 may be monitored. Such monitoring may occur via one or more sensors 42. In an embodiment, the sensors 42 are part of a conventional Health and Usage Monitoring System (HUMS) or Structural Health Monitoring (SHM) system, as is known to a person having ordinary skill in the art.

The sensors 42 may be operable to measure one or more characteristics associated with a level of damage of the one or more components or subsystems of the aircraft being monitored. It should be understood that the plurality of sensors 42 associated with the one or more components or subsystems may be the same or, alternatively, may vary. In an embodiment, a first sensor 42a operably coupled to a first component is configured to measure a first characteristic and a second sensor 42b operably coupled to a second component is configured to measure a second, distinct characteristic. The measurements recorded by the sensors 42 are provided as feedback to a detection algorithm run by a processor.

The detection algorithm, illustrated schematically at 44, is operable to determine or identify a health status of the one or more components or subsystems of the aircraft 10 being monitored. In an embodiment, the detection algorithm 44 is configured to access a plurality of stored models 46 for evaluating the input data from the plurality of sensors 42. The stored models 46 may be stored within at least one memory accessible by the processor. The at least one memory may for example, be selected from a UVPROM, EEPROM, FLASH, RAM. ROM. DVD, CD, a hard drive, or other computer readable medium which stores the cost models described herein.

The stored models 46 are used to process and evaluate the input data 52 for each component being monitored. Using aircraft state data and the sensed operability data, the models 46 within the detection algorithm evaluate the operability and damage of each component in real time. Examples of the aircraft state data may include vehicle condition data, such as airspeed, altitude, attitude, air temperature, body orientation, body angular rates, body angular acceleration, body linear acceleration, mass, fuel flow, load factor, and drive train information including torque, cycles, and revolutions per minute for example. In one embodiment, the aircraft state data is provided to the detection algorithm by one or more sensors 48 of the aircraft 10 arranged in communication directly or indirectly with the processor. The one or more sensors 48 for collecting aircraft state data are illustrated and described herein as being distinct from the sensors 42 for measuring the behavior and/or operation of one or more components of the aircraft 10. However, embodiments where at least one of the sensors is configured to perform both behavior/operation monitoring and collect aircraft state data is also contemplated herein.

Data associated with each of the components being monitored is stored within a component damage database, illustrated schematically at 50. In addition to storing identification information, such as part numbers, serial numbers, and installation locations for example, a current status, including an assessment of actual damage and remaining life of each component of the aircraft 10 being monitored is stored therein. As shown, the component damage database 50 is arranged in communication with the detection algorithm 44. The detection algorithm 44 may use the most recent status stored within the component damage database 50 when evaluating the current damage of a component. The most recent status stored within the component damage database 50 may have been previously calculated by the detection algorithm 44, or alternatively, may be a default value indicating that the component is fully operable, such as in embodiments where the component was recently replaced. The detection algorithm 44 uses the operability data and aircraft state data to evaluate the loading and damage of each component in view of the most recent status information.

In addition to being stored within the component damage database, the determination of the damage and remaining life of the one or more components being monitored calculated is supplied to a flight envelope restriction algorithm shown at 52. In response to the information output from the detection algorithm 44, the flight envelope restriction algorithm 52 is configured to establish a modified aircraft operational envelope. The modified aircraft operational envelope may serve to restrict the loads imposed on damaged or compromised aircraft components by adjusting one or more control laws for operating the aircraft 10. Examples of the flight characteristics that may be modified by the flight envelope restriction algorithm include, but are not limited to, a max command rate of acceleration, load limits, airspeed, altitude, and axis maneuvering limits for example.

In an embodiment, the modified operational envelope generated by the flight envelope restriction algorithm 52 defines one or more outer boundaries or limits within which the aircraft 10 is allowed to operate. The outer boundaries may be developed as the operational limits necessary to complete the mission and reach a desired location without catastrophic failure of any component or subsystem. It should be understood that the boundaries of the modified flight envelope may be less than the actual operational capabilities of the aircraft 10. The operational envelop may serve to limit or restrict one or more commands issued by a pilot, at least to an extent that the commands direct an operation of the aircraft that exceeds the operational envelope. In this manner, the pilot is prohibited from commanding a state of operation that exceeds a safe or reliable operations threshold. Accordingly, the outer boundaries of the modified operational envelope cannot be modified or overridden by the pilot.

Fatigue damage occurs on a component when maneuver severity increases the component load above an endurance limit. In an embodiment, the modified operational envelope developed by the flight envelope restriction algorithm includes an intermediate operational envelope including one or more intermediate boundaries to limit component loading to below a corresponding endurance limit. By limiting loading to below the endurance limit, operation of the aircraft 10 within the intermediate boundaries does not accrue additional damage, or minimizes further damage of a component until the operator decides that it is convenient to replace the component. The intermediate boundaries determined by the flight envelope restriction algorithm 52 define a limit intended to maximize the life and minimize further damage of the components being monitored. However, it should be understood that the pilot is not prohibited from commanding a state of operation that exceeds the intermediate boundaries.

The modified operational envelope is communicated from the flight envelope restriction algorithm 52 to a communication link 54 suitable for transferring data between the aircraft 10 and a ground station. The status of the aircraft 10 including the modified operational envelope and the life expectancy and identified damage of the components being monitored may be further communicated to an off board maintenance and mission planner 56. The off board maintenance and mission planner 56 is configured to schedule future events associated with the aircraft 10, including maintenance procedures and future missions suitable based on the status and allowable operational capability of the aircraft 10. The modified operational envelope is additionally communicated from the flight envelope restriction algorithm 52 to an onboard mission and flight path planner 58. The onboard mission and flight planner 58 is configured to adapt the current mission and the flight path for performing the current mission in real time in response to the modified operational envelopes generated by the flight envelope restriction algorithm 52.

The flight envelope restriction algorithm 52 is operably coupled to and is configured to communicate the resultant modified operational envelope to a flight control computer, illustrated schematically at 60, of the aircraft 10. Although the system illustrated and described herein includes a single flight control computer. Embodiments including multiple flight control computers 60 are also contemplated herein. The flight control computer 60, which is part of a fly-by-wire flight control system, is configured to implement the modified operational envelope. The flight control computer 60 receives an output from the onboard mission and flight path planner 58 indicative or necessary changes in the mission or flight path to operate within the modified operational envelope. The flight control computer 60 is configured to implement these changes automatically and in real time.

The flight control computer 60 is connected to at least one output device 26. The flight control computer 60 is configured to provide one or more indications to the pilot and/or crew of the aircraft 10 via the at least one output device 62, representing the modified operational envelope. In an embodiment, the output device 62 is a display in the cockpit and the modified operational envelope may be represented graphically on the display. Alternatively or in addition, an audible or visual alarm may be generated as the aircraft 10 approaches the limits of the modified operational envelope.

In an embodiment, the flight control computer 60 may additionally provide information to the crew regarding the intermediate boundaries. For example, the intermediate boundaries may also be represented graphically on the display 62. Alternatively, a tactile cuing system 64 may operably couple the pilot controls (not shown) and the flight control computer 60. As the pilot moves one of the controls, thereby generating a command near or exceeding an intermediate boundary, the tactile cuing system 64 may provide feedback to the pilot in the form of vibration, or added resistance, such as generated by a servo or active controller 66 coupled to the pilot controls. The tactile cuing system 64 is configured to indicate to the pilot that the commanded maneuvering of the aircraft 10 is approaching loading that will accrue damage on one or more components thereof. As a result, the pilot may be dissuaded from pursuing such a command once aware of the damage that the command could inflict.

An aircraft 10 having the adaptive control system 40 illustrated and described herein would have improved availability via the use of on-demand maintenance. Sensing degradation of components in real time and automatically restricting the aircraft operating envelop for safe continued flight maximizes operation of the aircraft even in a damaged state. The health monitoring additionally allows for more effective planning of future missions based on the real time monitoring of the current state of the aircraft 10.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. A method for providing adaptive control to a fly-by-wire aircraft comprising:
    measuring via at least one first sensor a characteristic of at least one component of the aircraft; measuring via at least one second sensor a state of the aircraft;
    determining, from the measuring of the characteristic of at least one component of the aircraft and the measuring of the state of the aircraft, at least one of an actual damage and remaining life of the at least one component of the aircraft; and
    adapting an operational envelope of the aircraft based on the at least one of actual damage and remaining life of the at least one component, wherein adapting the operational envelope includes:
        adjusting one or more outer boundaries of the operational envelope to prohibit operation of the aircraft exceeding a safe or reliable operation threshold; and
        generating one or more intermediate boundaries of the operational envelope, wherein operation of the aircraft within the intermediate boundaries minimizes further damage accrual of the at least one component, wherein operation of the aircraft is not prohibited from exceeding the one or more intermediate boundaries.

2. The method of claim 1, wherein measuring the characteristic of the at least one component and the measuring of the state of the aircraft occur while the aircraft is in flight.

3. The method of claim 1, wherein adapting the operational envelope occurs automatically and in real time while the aircraft is in flight.

4. The method of claim 1, further comprising providing one or more indicators of the adapted operational envelope to personnel associated with the aircraft.

5. The method of claim 4, wherein the adapted operational envelope is illustrated graphically on a display.

6. The method of claim 4, wherein providing one or more indicators of the adapted operational envelope includes providing feedback during operation of a pilot control via a tactile cuing system.

7. The method of claim 6, wherein the feedback includes at least one of vibration and resistance.

8. The method of claim 6, wherein the feedback is configured to indicate that a command generated via the pilot input is approaching loading of the aircraft that will accrue damage on the at least one component.

9. The method of claim 1, further comprising revising at least one of a mission and a corresponding flight plan in response to the adapted operational envelope.

10. The method of claim 1, wherein the aircraft is operable at a state between the one or more intermediate boundaries and the one or more outer boundaries.

11. A system for providing adaptive control of an aircraft comprising:
    at least one processor;
    at least one first sensor configured to monitor a characteristic of at least one component of the aircraft, the at least one first sensor being arranged in communication with the at least one processor;
    at least one second sensor configured to monitor a state of the aircraft, the at least one second sensor being arranged in communication with the at least one processor;
    memory in communication with the at least one processor and having instructions stored thereon that, when executed by the at least one processor, cause the system to:
        determine at least one of an actual damage and remaining life of the at least one component of the aircraft; and
        adapt an operational envelope of the aircraft based on the at least one of actual damage and remaining life of the at least one component, wherein the adaption of the operational envelope comprises:
            adjusting one or more outer boundaries of the operational envelope to prohibit operation of the aircraft exceeding a safe or reliable operation threshold; and
            generating one or more intermediate boundaries of the operational envelope, wherein operation of the aircraft within the intermediate boundaries minimizes further damage accrual of the at least one component, wherein operation of the aircraft is not prohibited from exceeding the one or more intermediate boundaries.

12. The system of claim 11, wherein the aircraft is a fly-by-wire aircraft.

13. The system of claim 11, wherein the processor is configured to adapt the operational envelope of the aircraft in real time.

14. The system of claim 11, further comprising an onboard mission and flight planner in communication with the processor, wherein the onboard mission and flight planner is operable to adapt a current mission and flight path in response to the adapted operational envelope.

15. The system of claim 11, further comprising at least one output device operably coupled to the processor, the at least one output device providing an indication of the adapted operational envelope.

16. The system of claim 15, wherein the at least one output device includes a display for graphically depicting the adapted operational envelope.

17. The system of claim 11, further comprising:
    at least one flight control for receiving a command; and
    a tactile cuing system operably coupled to the at least one flight control and to the processor, wherein the tactile cuing system is operable to indicate when the command provided to the at least one flight control causes operation of the aircraft to approach the one or more intermediate boundaries.

18. The system of claim 17, wherein the tactile cuing system is operable to indicate when the command provided to the at least one flight control causes operation of the aircraft to approach the one or more intermediate boundaries by providing a feedback to the at least one flight control including one or more of vibration and resistance.

* * * * *